United States Patent [19]
Miller et al.

[11] Patent Number: 5,524,238
[45] Date of Patent: Jun. 4, 1996

[54] USER SPECIFIC INTELLIGENT INTERFACE WHICH INTERCEPTS AND EITHER REPLACES OR PASSES COMMANDS TO A DATA IDENTITY AND THE FIELD ACCESSED

[75] Inventors: John A. Miller, Wilmette; David R. Cleven, Algonquin; Robert J. Wall, Highland Park, all of Ill.

[73] Assignee: Breakout I/O Corporation, Glenview, Ill.

[21] Appl. No.: 216,693

[22] Filed: Mar. 23, 1994

[51] Int. Cl.⁶ .................................................. G06F 17/30
[52] U.S. Cl. ................. 395/600; 395/825; 364/260.3; 364/282.1; 364/283.3; 364/286.4; 364/286.5; 364/DIG. 1
[58] Field of Search ........................ 395/600, 860, 395/825; 364/260.3, 282.1, 283.3, 286.4, 286.5

[56] References Cited

U.S. PATENT DOCUMENTS

| | | | |
|---|---|---|---|
| 4,604,686 | 8/1986 | Reiter et al. | 395/500 |
| 4,638,425 | 1/1987 | Hartung | 395/460 |
| 5,047,959 | 9/1991 | Phillips et al. | 395/160 |
| 5,051,898 | 9/1991 | Wright et al. | 395/600 |
| 5,072,406 | 12/1991 | Ammon | 395/64 |
| 5,079,718 | 1/1992 | Tanaka | 395/75 |
| 5,084,813 | 1/1992 | Ono | 395/700 |
| 5,115,501 | 5/1992 | Kerr | 395/600 |
| 5,142,665 | 8/1992 | Bigus | 395/21 |
| 5,163,147 | 11/1992 | Oreta | 395/600 |
| 5,202,828 | 4/1993 | Vertelney et al. | 364/419 |
| 5,265,221 | 11/1993 | Miller | 395/490 |
| 5,297,237 | 3/1994 | Masouka et al. | 395/23 |
| 5,367,698 | 11/1994 | Webber et al. | 395/800 |
| 5,432,924 | 7/1995 | D'Souza et al. | 395/600 |
| 5,432,934 | 7/1995 | Levin et al. | 395/650 |

OTHER PUBLICATIONS

Borland® Paradox® *Foh Dos User's Guide*, 1993 pp. 342–356.

Emery, "Omhis 5", PC Magazine v10, n10 p. 162(2), May 28, 1991.

Primary Examiner—Thomas G. Black
Assistant Examiner—Jack M. Choules
Attorney, Agent, or Firm—Wood, Phillips, VanSanten, Clark & Mortimer

[57] ABSTRACT

A user specific intelligent interface reduces the costs of application systems development and improves data security and productivity of a user interface by creating an intelligent interface customized to each specific user. The interface uses external intercepts to an application and allows external interface software to control data access and dynamically improve user productivity. The system uses a software utility that maintains tables which define permissions regarding use of specific data items in a specific context, and also processes instructions regarding the usage by specific users of individual data fields displayed on a screen. The system works in conjunction with an application to improve security, provide audit trails and productivity of each individual user's usage of the system. The system records usage data for each individual user which is analyzed to determine future actions.

18 Claims, 16 Drawing Sheets

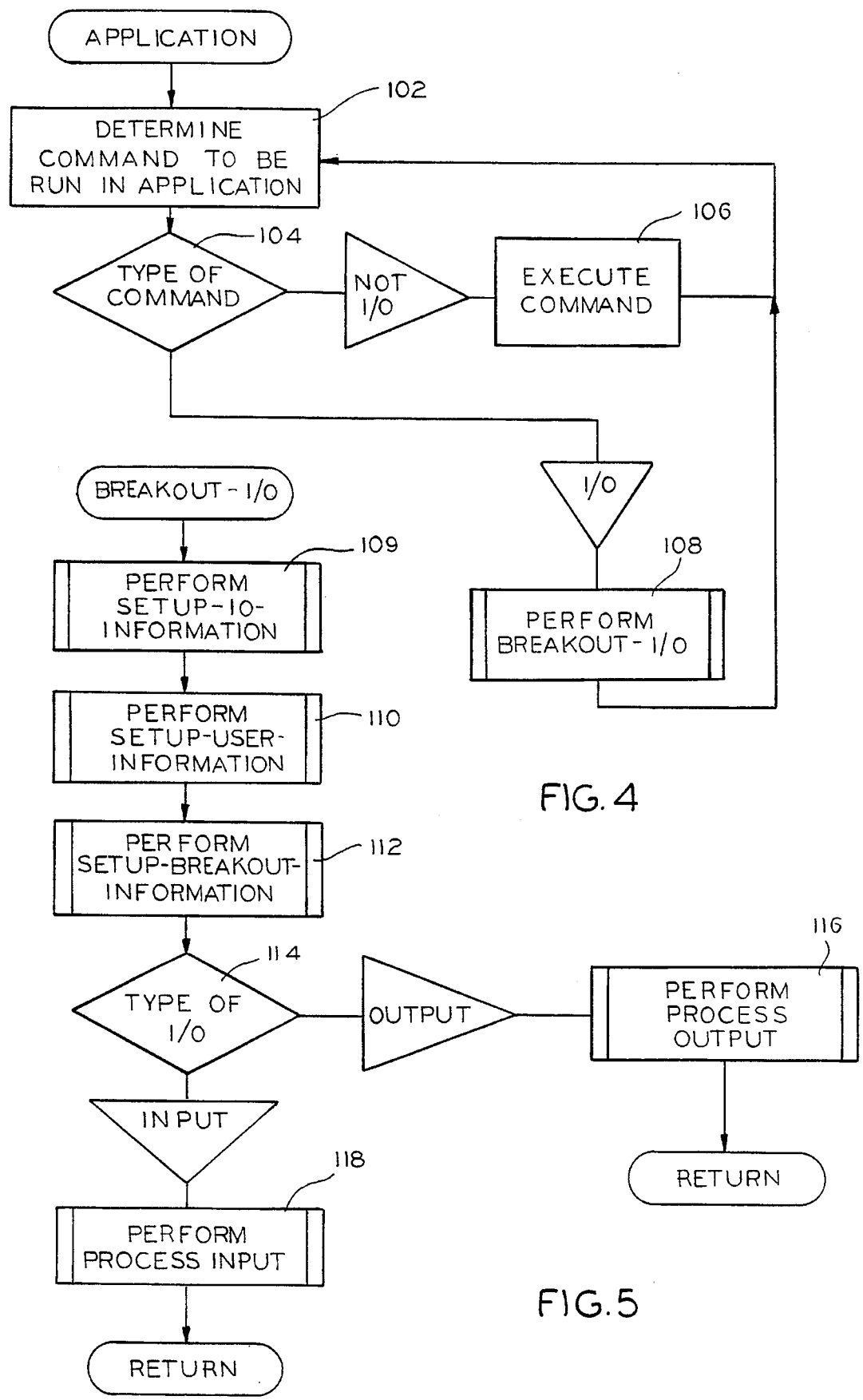

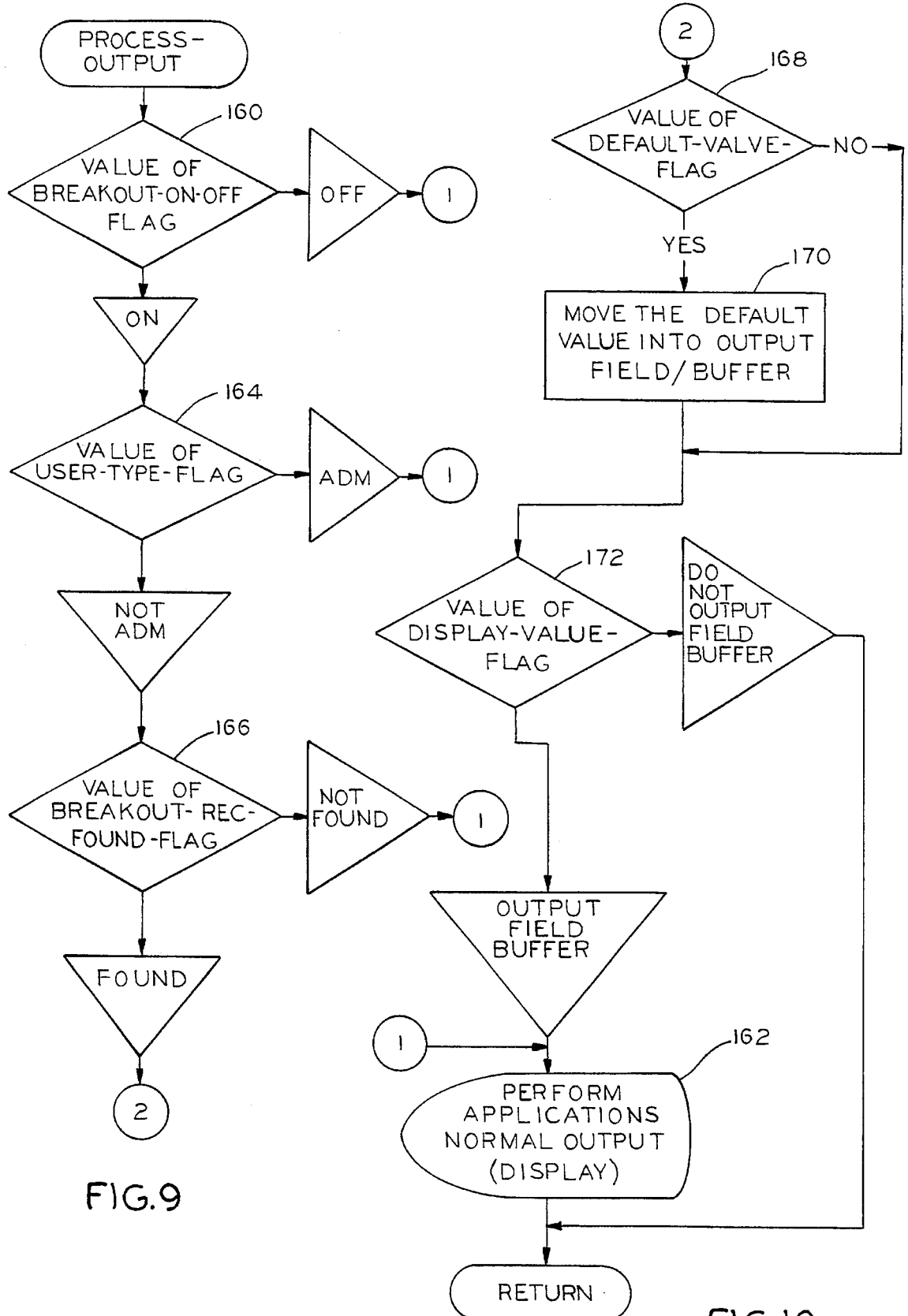

```
EDIT PREFERENCES                                          HELP
        A/R  I/C  |O E|  A/P  G/L  P/I   UPS CTL  OO
ORDERS (ENTER)
  CUSTOMER #    CUSTOMER NAME              PHONE #
 >> ARI001       ARIEL ENTERPRISES         213-554-4300
    BEV001       BEVERLY BEAUTY SUPPLY     216-778-9000
    CONNIES      CONNIES                                  (ENTER)
    ELL001       ELLIOT ENTERPRISES        906-779-6010
    HAR001       HARRIS,GOLDBERG & JONES   906-221-8500
    MOU001       MOUNTAIN GARDEN SUPPLY    208-234-3552
    MOU000       MOUNTAIN GARDEN SUPPLY    (208) 234-3552
    NEP001       NEPTUNE UNDERWATER SUPPLY 906-776-1102
    SPA001       SPACE CONCEPTS & DESIGN   212-220-9981
    TEST         TEST COMPANY              555-111-1111
    BJ001        W.J. BJORNFREG            906-886-7722
    CON001       WOLVERINE CONSTRUCTION    517-234-3552
    WAS001       WASHINGTON, MRS. THOMAS   906-444-7780
    WOL000       WOLVERINE CONSTRUCTION    (517) 234-3552
    WOL001       WOLVERINE CONSTRUCTION    (517) 234-3552

CUSTOMER NAME:_____
  PGUP/PGDN - F1 = BY CUSTOMER #
```

FIG. 20C

```
EDIT PREFERENCES                                          HELP
        A/R  I/C  |O/E|  A/P  G/L  P/I   UPS CTL  OO
ORDERS (ENTER)
        * ORDER #      17
     1.  ORDER DATE   2/25/94
     2.  ORDER TYPE   ORDER
     3.  CUSTOMER #   ARI001      4.  ARIEL ENTERPRISES
                                   5.  555 N. GRAND BLVD.
                                   6.  MADISON, WI. 42031
                                   7.

8.  SHIP TO                    9.  ARIEL ENTERPRISES
                                  10.  555 N. GRAND BLVD.
                                  11.  MADISON WI 42031
                                  12.

13.  SALES REP   TZD TOM DEE
    14.  CUST PO #                 19.  WAREHOUSE
    15.  SHIP VIA      (940102 ENTER)  20.  PFT CNTR
    16.  SHIP DATE
    17.  TERMS
    18.  TAX CODE
```

FIG. 20D

```
EDIT PREFERENCES                                              HELP
           A/R  I/C  |O/E|  A/P  G/L  P/I  UPS  CTL  OO
ORDERS (ENTER)
        *ORDER #      17
      1. ORDER DATE   2/25/94
      2. ORDER TYPE   ORDER
      3. CUSTOMER #   AR1001
                                    4. ARIEL ENTERPRISES
                                    5. 555 N. GRAND BLVD.
                                    6. MADISON, WI. 42031
                                    7.

8. SHIP TO                    9. ARIEL ENTERPRISES
                                   10. 555 N. GRAND BLVD.
                                   11. MADISON, WI. 42031
                                   12.

13. SALES REP    TZD TOM DEE
     14. CUST PO#     940102            19. WAREHOUSE "ALL"
     15. SHIP VIA     U  UPS            20. PFT CNTR    100
     16. SHIP DATE    2/25/94
     17. TERMS        3  5/10 NET 25
     18. TAX CODE     WI. WISCONSIN SALES TAX

F5 = CORRECTING
FIELD NUMBER TO CHANGE ?
```

FIG. 20E

USER SPECIFIC INTELLIGENT INTERFACE WHICH INTERCEPTS AND EITHER REPLACES OR PASSES COMMANDS TO A DATA IDENTITY AND THE FIELD ACCESSED

FIELD OF THE INVENTION

This invention relates to data processing systems and, more particularly, to an user specific intelligent interface for database-type application programs.

BACKGROUND OF THE INVENTION

A data processing system conventionally includes a central processing unit (CPU), associated memos, input devices such as keyboard and pointing device, and an output display monitor for displaying information. Such a system is capable of running numerous different types of application programs. One type of application program is known as a database program. A typical database program includes a table into which data can be entered. Inquiries about the data can then be made, as well as reports being generated.

The typical database program displays tables on the display monitor. The table has plural fields to be filled in by a user, with input commands entered on the keyboard or using the mouse. For example, in an order entry system, the table might include fields relating to an order number, customer invoice and shipping information, as well as sales information. A typical such display is illustrated in FIG. 20B. Typically, the user must key in information for each field. Alternatively, pop-up menus may be provided for select fields.

While such a database application program is a vast improvement over prior manual-type systems, there, remains room for improvement. For example, in the discussed order entry system, a user must fill in data for each and every field. Advantageously, default values might be used for certain fields to minimize keying in of data. Care must be taken, however, in selecting default values as the particular default values required might change depending on the individual user or job responsibilities of the individual user. For example, a salesman might have different information available than an accountant. Likewise, different levels of security are necessary with respect to different individuals or job responsibilities. While these requirements can be satisfied directly in the application program, doing so requires design considerations in the software application development with respect to specific user security and productivity factors.

The present invention is directed to solving one or more of the problems discussed above in a novel and simple manner.

SUMMARY OF THE INVENTION

In accordance with the invention there is provided an user specific intelligent interface for a data processing system.

In accordance with another aspect of the invention there is provided a universal user interface for database.-type application program without changes being required to the application program.

Broadly, there is disclosed herein an user specific intelligent interface for a a data processing system including a central processing unit (CPU), memory, means for receiving input commands from an input device and means for transmitting output commands to an output device. The CPU runs an application program stored in the memory. The application program implements a structured dialog, represented by a table having plural fields, in which the application transmits to the output device output commands associated with fields in the table and also transmits to the output device requests for input commands to be entered on the input device for insertion in the fields. The user specific intelligent interface comprises file means for storing in the memory a plurality of record files, each identifying a specific user with a user ID. Each record file stores input and output commands operatively associated with each user ID for generating user specific record file stored input or output commands for select fields in the application program table. Input intercept means intercept each request for an input command transmitted by the application. Output intercept means intercept each output command transmitted by the application. Processing means are operatively associated with the file means, the input intercept means and the output intercept means, for determining if a request for an input command to be entered by a user or an output command transmitted by the application is for one of the select fields, and if so then implementing the stored input and/or output commands for the select field, and otherwise passing the received input command to the application or the transmitted output command to the output device.

It is a feature of the invention that the input command is passed to the application program after a terminate command is entered on the input device and wherein the file means transmits any stored input command from the record file select field and the user accepts the stored input command by entering a terminate command.

It is another feature of the invention that the file means selectively includes a stored terminate command for select ones of the fields so that a user cannot change a stored input command.

It is yet another feature of the invention that the processing means includes log means for selectively recording usage of each user ID record file stored input and output command.

It is still another feature of the invention that the file means stores a user password associated with each user ID.

More particularly, the disclosed system reduces the costs of systems development and improves data security and productivity of a user interface by creating an intelligent interface customized to each specific user. The interface uses external intercepts to an application and allows external interface software to control data access and dynamically improve user productivity. The system uses a software utility that maintains tables which define permissions regarding use of specific data items in a specific context, and also processes instructions regarding the usage by specific users of individual data fields displayed on a screen. The system works in conjunction with an application to improve security, provide audit trails and productivity of each individual user's usage of the system. The system records usage data for each individual user which is analyzed to determine future actions.

The system intercepts or filters data being sent between each specific user and the application program. It performs a defined set of functions on the data before passing the data on or passing other data on to the user or application. The system also records the usage of each application for the purpose of facilitating future similar usage and learns the manner in which each specific user interacts with the applications and helps with tasks that involve repetition. Furthermore, the system simplifies problems in software application development by reducing; design considerations involving specific user security and productivity factors.

Further features and advantages of the invention will be readily apparent from the specification and from the drawing.

BRIEF DESCRIPTION OF THE DRAWING

FIGS. 3–19 comprise a series of flow diagrams illustrating a program for implementing the user specific intelligent interface according to the invention; and FIGS. 20A–20E comprise a series of display screens illustrating use of the user specific intelligent interface for an order entry database application program.

DETAILED DESCRIPTION OF THE INVENTION

Figure 1:
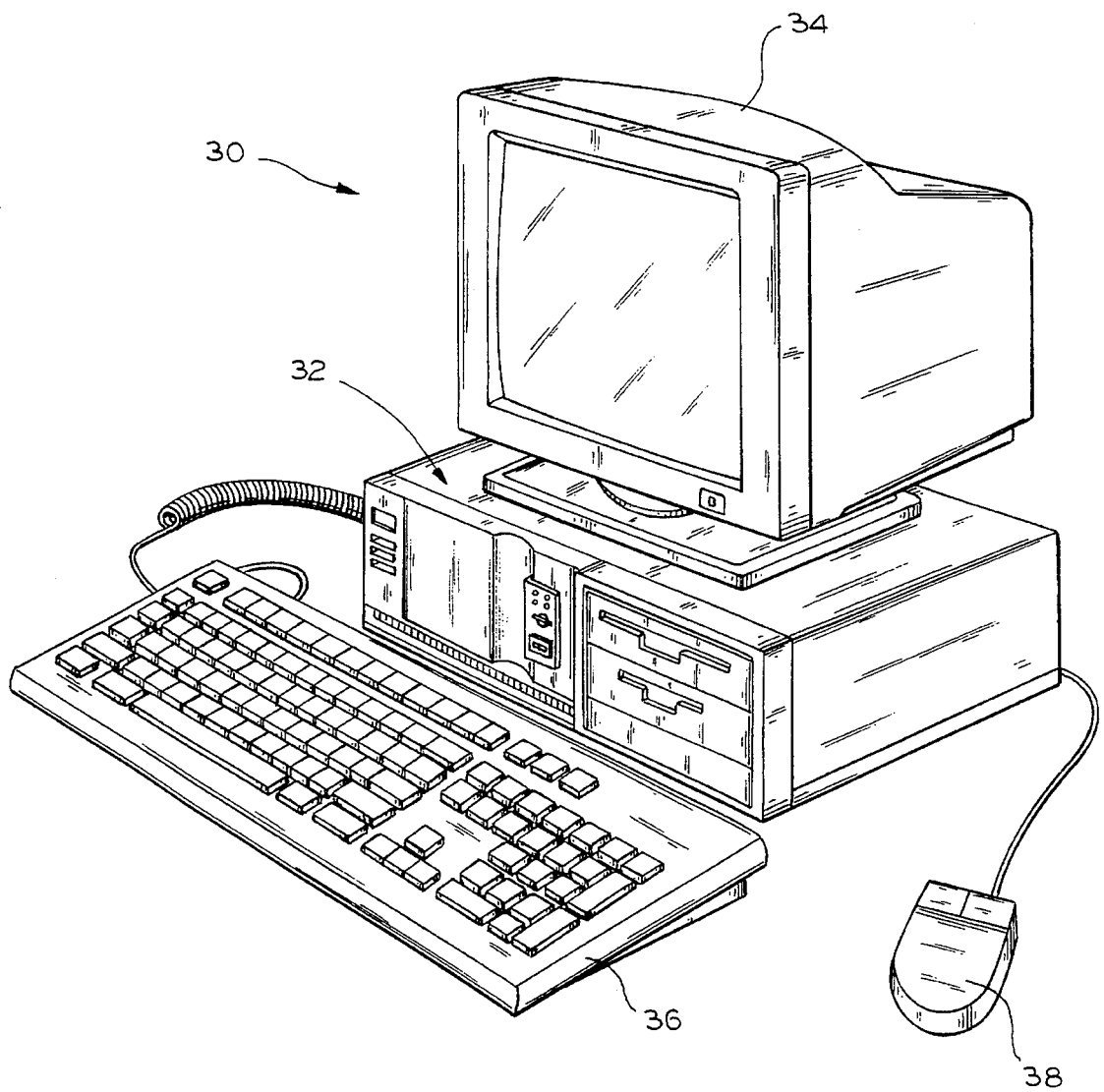
FIG. 1 is a perspective view of a data processing system including the intelligent interface according to the invention.

Referring to FIG. 1, a data processing system 30 includes a user specific intelligent interface according to the invention. The user specific intelligent interface comprises a software routine run on the data processing system which allows reduction of costs of system development and improves both data security and productivity for specific users.

The data processing system 30 includes a central processing unit (CPU) 32 connected to a video display monitor 34, keyboard 36, and pointing device in the form of a mouse 38. The CPU 32 may comprise any conventional personal computer having a microprocessor and associated memory circuits such as RAM, ROM, hard disk or floppy disk drives or the like. Alternatively, the CPU 32 may be a mainframe computer, network server or any other type system as necessitated by the particular application. The display monitor 34 may be any conventional display suitable for the particular application. Likewise, the keyboard 36 is illustrated as a conventional personal computer keyboard. The particular configuration does not form part of the invention.

The keyboard 36 enters input commands to the CPU 32. The monitor 34 displays information developed by the CPU 32. The particular commands and information displayed are dependent on the application program being run by the CPU 32.

The invention is described herein in connection with a single personal computer having an input device in the form of a keyboard and an output device in the form of a display monitor. As will be apparent, the system could be used with virtually any type input device or output device. For example, voice input and output devices could be used, or interprocessor network communications be used.

Figure 2:
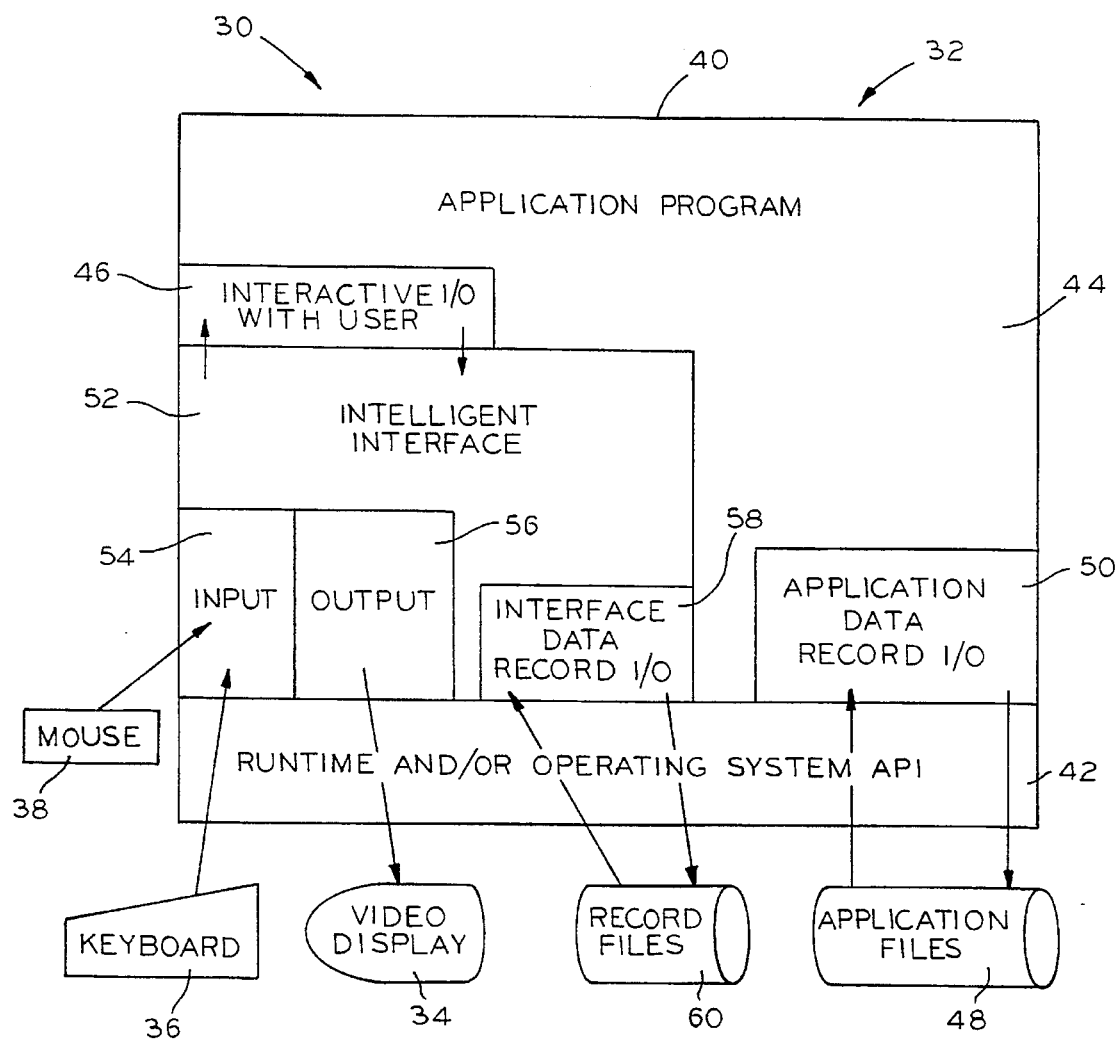
FIG. 2 is a block diagram representation of the system of FIG. 1.

With reference to FIG. 2, the data processing system 30 of FIG. 1 is illustrated in a block diagram form with functions of the CPU 32 including associated memory being illustrated as a function block 40.

The function block 40 particularly illustrates routines or programs stored in computer memory which is run by the CPU. These include a conventional run time and/or operating system application programming interface 42 for interfacing with an application program 44. While the application program 44 may be any conventional type program, the intelligent interface of the invention is particularly adapted for use with an application program implementing a context oriented structured dialog with a user.

A conventional application program 44 of the type described includes an interactive I/O routine 46 for interacting with a user via the keyboard 36 and display 34. Likewise, the application program 44 interfaces with application files 48, such as stored on a hard disk, via an application data record I/O routine 50. In the typical application, the application program instructs the CPU 32 to develop output commands transmitted via the interactive I/O routine 46 to the video display 34 and receives input commands from the keyboard 36 also via the interactive I/O routine 46.

In accordance with the invention, a user specific intelligent interface program 52 is functionally interposed between the interactive I/O routine 46 of the application program 44 and the I/O devices including the keyboard 36, video display 34 and pointing device 38. The intelligent interface 52 intercepts input commands entered on the keyboard 36 or mouse 38, or requests for input transmitted by the CPU 32, and processes these commands so that the user input is either passed directly to the application program 44 or directly substitutes default user specific information, as discussed below. Likewise, output commands from the output program 44 to the display 34 are intercepted by the interface 52 and either passed through or alternatively commands generated by the interface are displayed as described below.

The intelligent interface 52 interfaces with the keyboard 36 and mouse 38 via an input routine 54 and with the video display 34 via and output routine 56. An interface data record I/O routine 58 interfaces with record files 60, again which may be stored on a hard disk or other memory device.

Figure 3:
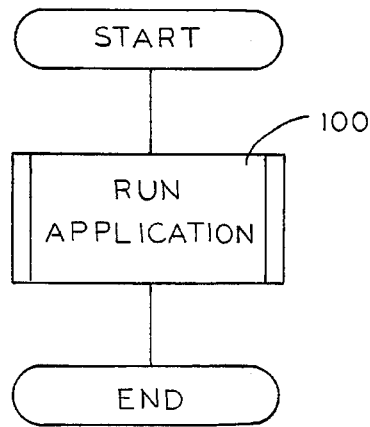

With reference to FIGS. 3–19, a series of flow diagrams illustrate software routines implemented in the function block 40 of FIG. 2. With initial reference to FIG. 3, a straightforward block illustrates that upon starting, an application is run at a block 100. The application may comprise any conventional application program. As described herein, the intelligent interface is adapted for use with an application program implementing a structured dialog, represented by a table having plural fields. The CPU 32 transmits to the display 34 output commands associated with fields in the table, and also transmits to the display 34 requests for input commands to be entered on the keyboard 36 or with the mouse 38 for insertion in the fields With reference to FIG. 4, a flow diagram illustrates a basic loop for the application run at the block 100 of FIG. 3. The application begins at a block 102 which determines if a command is to be run in the application. A decision block 104 determines the type of command. If the command is not an I/O command, that is, an input command or an output command, then the command is executed at a block 106 and the system returns to the block 102 for the next command. If the command is an I/O command, then a BREAKOUT-I/O routine is implemented at a block 108. Control then returns to the block 102.

The procedure for intercepting commands and invoking the BREAKOUT-I/O routine depends on the particular application program. In a COBOL application an I/O routine is called by executing a Screen function. The standard Screen function can be replaced with a modified function which calls the BREAKOUT-I/O routine and upon completion executes the standard Screen function.

The BREAKOUT-I/O routine is illustrated in FIG. 5. The BREAKOUT-I/O routine is a software program that sits between the user and the application to filter and/or change input commands or output commands. The program is external from the application program. The application calls the BREAKOUT-I/O routine with an identification of the input field and a location on the display of the field. The BREAKOUT-I/O returns back to the application the value into the field.

The BREAKOUT-I/O routine begins at a block 109 which performs a SETUP IO INFORMATION routine. This routine determines if the original I/O call is input or output and the current mode. The next block 110 performs a SETUP USER INFORMATION routine. The user information consists of a file of valid user names and corresponding passwords. There is an additional field called user-type. The field has two values, a general user and system administrator. The system administrator has permission to make changes and the intelligent interface I/O features do not apply to the system administrators. The user ID's and user password may be any alpha-numeric value. There is also a user on/off flag to be set at startup for the specific user. A PERFORM SETUP BREAKOUT INFORMATION routine is implemented at a block 112. This routine reads from the record file 60.

A decision block 114 determines the type of I/O. If output, then a PERFORM PROCESS OUTPUT routine is implemented at a block 116. If input, then a PERFORM PROCESS INPUT routine is implemented at a block 118. From either block 116 or 118, the routine returns to the flow diagram of FIG. 4.

Figure 6A:
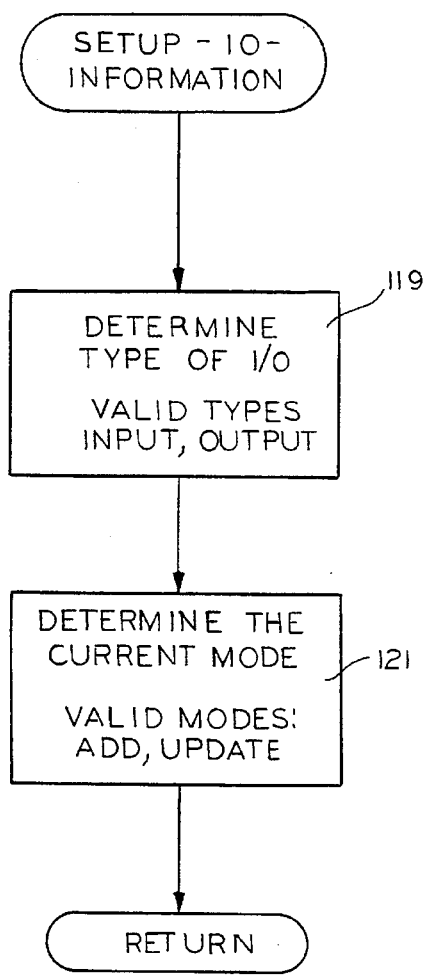

The SETUP IO INFORMATION routine is illustrated in FIG. 6A. At a block 119 the system determines if the type of I/O called was for an input or output. Next, the current mode is determined at a block 122. The routine then ends.

Figure 6B:
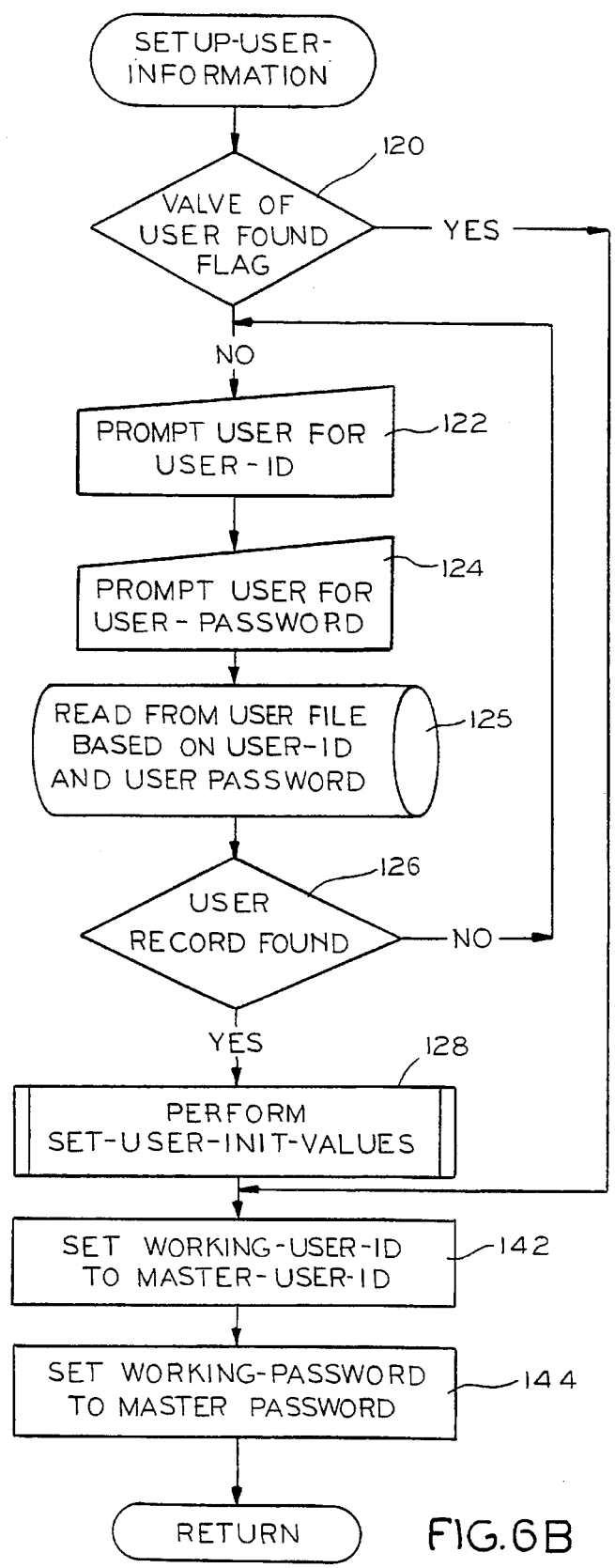
Figures 7, 8:
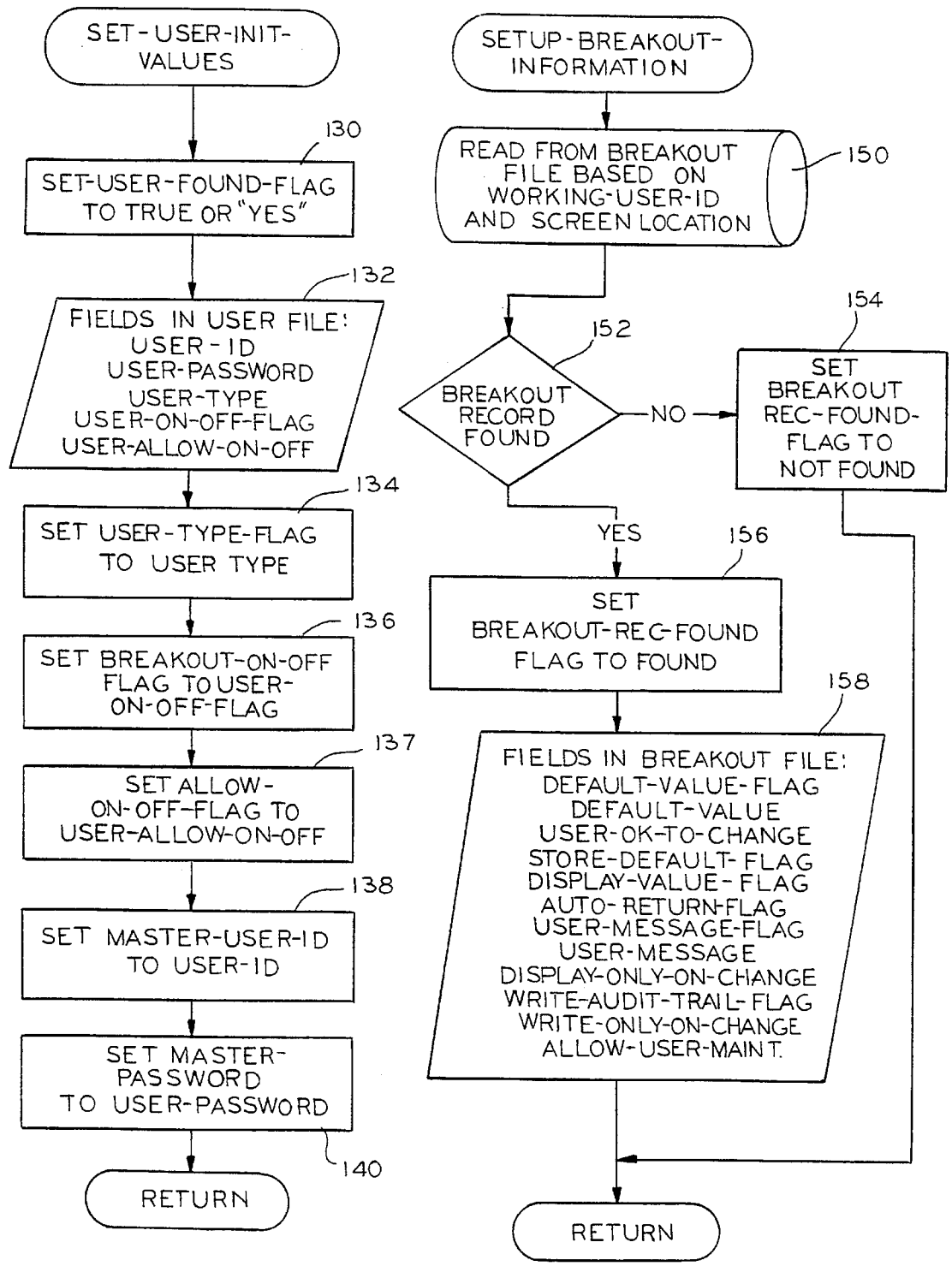

Referring to FIG. 6B, a flow diagram illustrates the SETUP USER INFORMATION routine implemented at the block 110 of FIG. 5. This routine begins at a decision block 120 which determines if a user flag is found for the particular user who has logged on. If not, then a user is prompted for a user ID at a block 122 and for a user password at a block 124. The system then reads from the user file based on the entered user Id and user password at a block 125. A decision block 126 determines if a user record file was found among the stored record files 60, see FIG. 2. If not, then control returns to the block 122. If a user record file was found, then a PERFORM SET USER INITIAL VALUES is implemented at a block 128. This routine is illustrated in FIG. 7. This routine sets all the initial values for work fields. The values for the fields come from the user file.

The SET USER INITIAL VALUES routine begins at a block 130 which sets the user found flag to "true" or "yes". At a block 132 the fields in the user file discussed above are accessed. The user type flag is set to user type at a block 134. The breakout on/off flag is set to the user on/off flag value at a block 136. A user allow on-off flag is set at a block 137. This flag determines if a user can turn the breakout function on and off. The master user ID is set to the user ID at a block 138 and the master password is set to the user password at a block 140. This routine then ends by returning to the flow diagram of FIG. 6B.

Returning again to FIG. 6B, when control finishes the SET USER INITIAL VALUES routine at the block 128, or if the value of the user found flag was "yes" at the decision block 120, then the working user ID is set to the master user ID at a block 142 and the working password is set to the master password at a block 144. This routine then ends by returning to the flow diagram of FIG. 5.

Referring to FIG. 8, a flow diagram illustrates the SETUP BREAKOUT INFORMATION routine performed at the block 112 of FIG. 5. This procedure reads information from the record file 60, see FIG. 2. This is done at a block 150 which reads the breakout or record file based on the particular working user ID and screen location. In accordance with the invention, the intelligent interface is user specific in that a specific record file can be provided for each individual user or type of user, as necessary or desired. A decision block 152 determines if a breakout record file is found. If not, then a breakout record found flag is set to "not found" at a block 154 and the system returns. If a breakout record file is found, then the breakout record found flag is set to "found" at a block 156. The fields in the particular breakout file are illustrated in a block 158. The following is a list of fields and their valid values:

A) Default-Value-Flag
"Y" or "N"

B) Default-Value
Any numeric, alpha-numeric, any special key

C) Auto-Return-Flag
"A" for only during add mode
"C" for only during change mode
"B" for both add and change modes D) User-OK-To-Change
"Y" or "N"

E) Store-Default-Flag
"Y" or "N"

F) Display-Value-Flag
"Y" or "N"

G) User-Message-Flag
"Y" or "N"

H) User-Message
Any alpha-numeric

I) Display-Only-On-Change
"Y" or "N"

J) Write-Audit-Trail-Flag
"Y" or "N"

K) Write-Only-On-Change
"Y" or "N"

L) Allow User Maintenance
"Y" or "N"

The routine then ends as by returning to the flow diagram of FIG. 5.

With reference to FIGS. 9 and 10, a flow diagram illustrates the PROCESS OUTPUT routine performed at the block 116 of FIG. 5. The PROCESS OUTPUT routine processes output commands. Output commands are the commands that display information in table fields on the user's display monitor 34. These can be the commands developed by the CPU 32 or commands substituted by the intelligent interface 52 based on the user specific program requirements.

The PROCESS OUTPUT routine begins at a decision block 160 which determines the value of the breakout on/off flag. If off, then control proceeds to a block 162 of FIG. 10, which performs the application's normal output display and the routine then ends. If the value of the flag is on, then a decision block 164 determines the value of the user type flag. If administrator, then control proceeds to the; block 162. If not administrator, i.e., general user, then a decision block 166 determines the value of the breakout record found flag. If not found, then control proceeds to the block 162. If the flag is found, then control advances to the routine illustrated in FIG. 10 for determining the output command stored in the record file 60 to be used. A stored default value can be used for the value that is to be displayed on the monitor 34. By using this feature, any literal that is to be displayed on the screen can be changed to a different literal. Alternatively, the format of the value can be changed, such as, for example, by changing font or translating to a different language. A decision block 168 determines the value of the default value flag. If "yes", then the default value is moved into the output field/buffer at a block 170. The default value and the default value flags comprise records in the breakout file, as shown at block 158 of FIG. 8. If the default value flag is "no", or after the default value has been moved into the output field/buffer, then a decision block 172 determines the value of the display value flag. If it is to not output the field/buffer value, then the routine ends. If the value is to output the field/buffer value, then the application's normal output display is implemented at a block 162. However, since the output command developed by the CPU may have been replaced with the default value, the application's normal output might consist of the substituted default value output entered into the output field/buffer at the block 170. The system then returns to the flow diagram of FIG. 5.

Referring to FIGS. 11–15, a series of flow diagrams illustrate the PROCESS INPUT routine performed at the block 118 of FIG. 5. This routine processes input commands. Input commands include both requests for input transmitted by the CPU 32 and actual input data received from the user via the keyboard 36 or pointing device 38.

This routine begins at a decision block 174 which determines the value of the breakout on/off flag. If off, then the normal input command is processed by advancing via a node 3 to a block 176 of FIG. 13 to perform the application's normal input read as by prompting the user for an input value. When the value is entered and terminated by pressing an enter key, or entered using a select function key, the input command is passed directly to the CPU 32. Control action following the block 176 is discussed below.

Figures 11, 12:
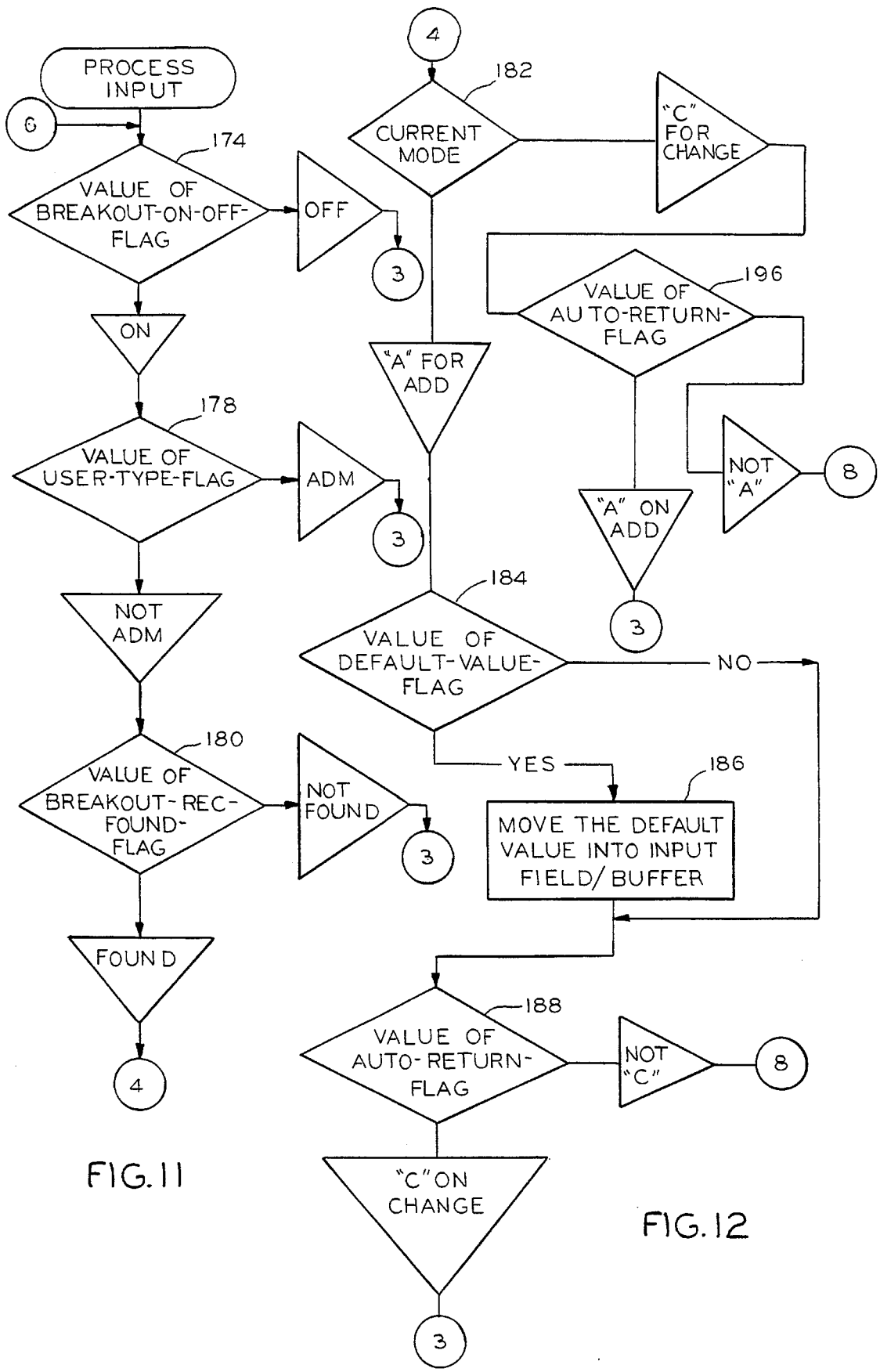

Returning to the decision block 174 of FIG. 11, if the value of the breakout on/off flag is on, then a decision block 178 determines the value of the user type flag. If administrator, then control advances to the block 176 of FIG. 13. If not administrator, then a decision block 180 determines the value of the breakout record found flag. If not found, then control proceeds to the block 176 of FIG. 13. If found, then control advances via a node 4 to a decision block 182 of FIG. 12 which determines the current mode of operation. The current mode is the input mode being used. There are two different values for the current mode. The values are "C" for change mode and "A" for add mode. The definition of add mode is when the user is adding new information, such as an order in order entry. The definition of change mode is when the user is editing existing information, such as changing an order in order entry. In the add mode, the system checks the autoreturn flag as to whether to prompt the user for input or to use the default value. In the change mode, the system checks the autoreturn flag as to whether to prompt the user for input or to use the existing value.

If the current mode is add mode, then a decision block 184 determines the value of the default value flag. If yes, then the default value is moved into the input field/buffer at a block 186. Thereafter, or if the default value flag was no, then a decision block 188 determines the value of the autoreturn flag. The autoreturn flag is used to automatically simulate termination of the data for an input command, as discussed above. This can be used to prevent the user from overriding values in either the add mode or the change mode. If the autoreturn flag is set so that the autoreturn is used only in the change mode, the control proceeds to the block 176 of FIG. 13 to perform the application's normal input read discussed above. If not "C", then the autoreturn flag is set to either "A" or "B" for add mode or both add mode and change mode, then control proceeds via node 8 to a block 190 of FIG. 13. In this situation, based on the current mode and autoreturn flag, it is determined that the field should not prompt the user for input, but rather use the default value and perform an autoreturn. Since the I/O command is an input command, it needs to be changed to an output command to display the default value on the user's screen. This is done at the block 190 initially by changing the I/O command from input to output. A decision block 192 determines the value of the display value flag. If not output field/buffer, then control proceeds to node 5. If the value is output field/buffer, then the application's normal output display routine is implemented at a block 194 so that the default value is then displayed.

Returning to the flow diagram of FIG. 12, if the current mode is the change mode, as determined at the decision block 182, then a decision block 196 determines the value of the autoreturn flag. If "A", then control proceeds to the block 176 of FIG. 13. If not "A", then control proceeds to the block 190 of FIG. 13.

Figure 13:
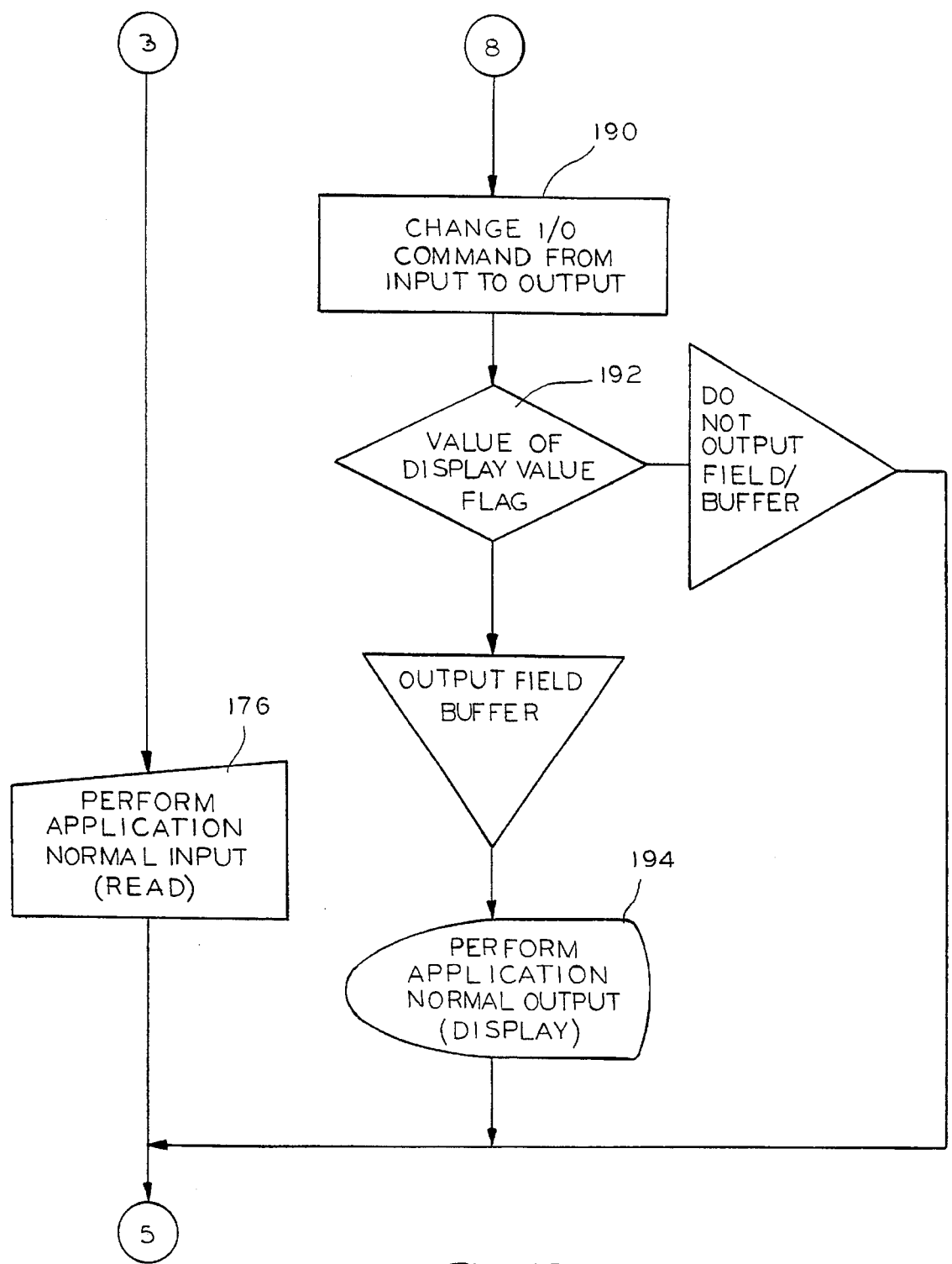
Figure 14:
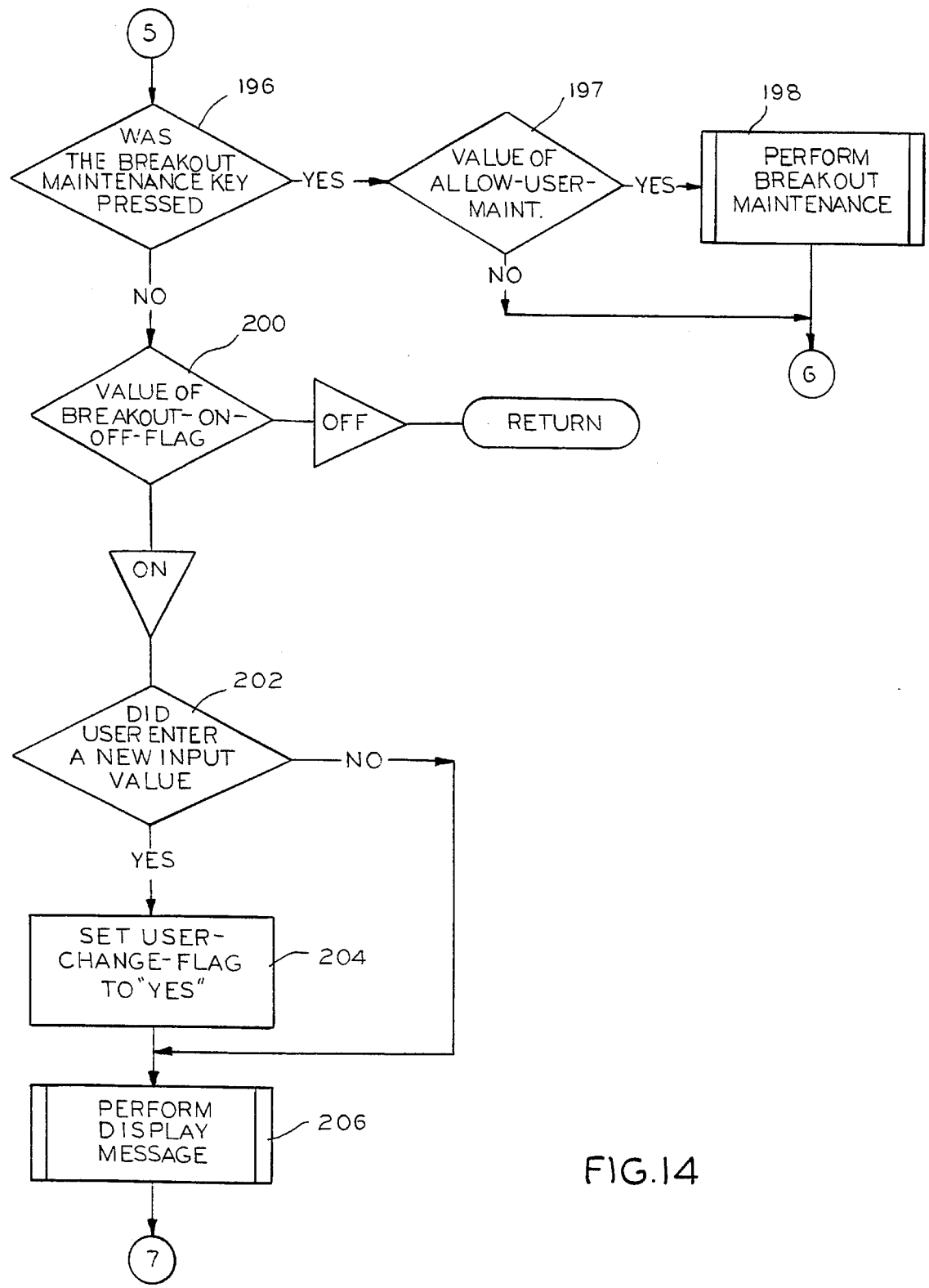

From the node 5 of FIG. 13, control advances to FIG. 14. After an I/O command, it is necessary to process the returned value. This includes checking for a breakout maintenance key, whether to display a message, and perform an audit trail. This begins at a decision block 196 which determines if a breakout maintenance key was pressed. If yes, then a decision block 197 determines if the user is allowed to perform maintenance based on the flag setting discussed above. If not, then control returns to the decision block 174 of FIG. 11. If so, then control implements a BREAKOUT MAINTENANCE routine at a block 198, discussed below, and then returns to the decision block 174 of FIG. 11. If the breakout maintenance key was not pressed, then a decision block 200 determines the value of the breakout on/off flag. If off, then the routine ends as by returning to the flow diagram of FIG. 5. If on, then a decision block 202 determines if the user entered a new input value. If yes, then a user change flag is set to yes at a block 204 thereafter, or if a user did not enter a new input value, then a DISPLAY MESSAGE routine is performed at a block 206. This routine is also discussed below. After performing the DISPLAY MESSAGE routine, then control proceeds to decision block 208 of FIG. 15. If the user does not have permission to change the input value for the input field, then the intelligent interface prompts the user for a temporary user ID and password. This allows a user having permission to change the value to enter the user ID and password so that the change can be made. The decision block: 208 determines the value: of the user OK to change flag. If no, then the user is prompted for a temporary user ID and password at a block 210. A decision block 209 determines if the user hit the escape key to reenter an input. If yes, then control returns to the decision block 174 of FIG. 11. If not, then the temporary used ID and password are moved to the working user ID and password at a block 211 and the SETUP BREAKOUT INFORMATION routine is performed at a block 213. Control then returns to the decision block 208. If the user ok to change value is yes, then an audit trail/external function routine is performed at a block 212. A STORE DEFAULT routine is then performed at a block 214 and the system returns to the flow diagram of FIG. 5.

Figure 16A:
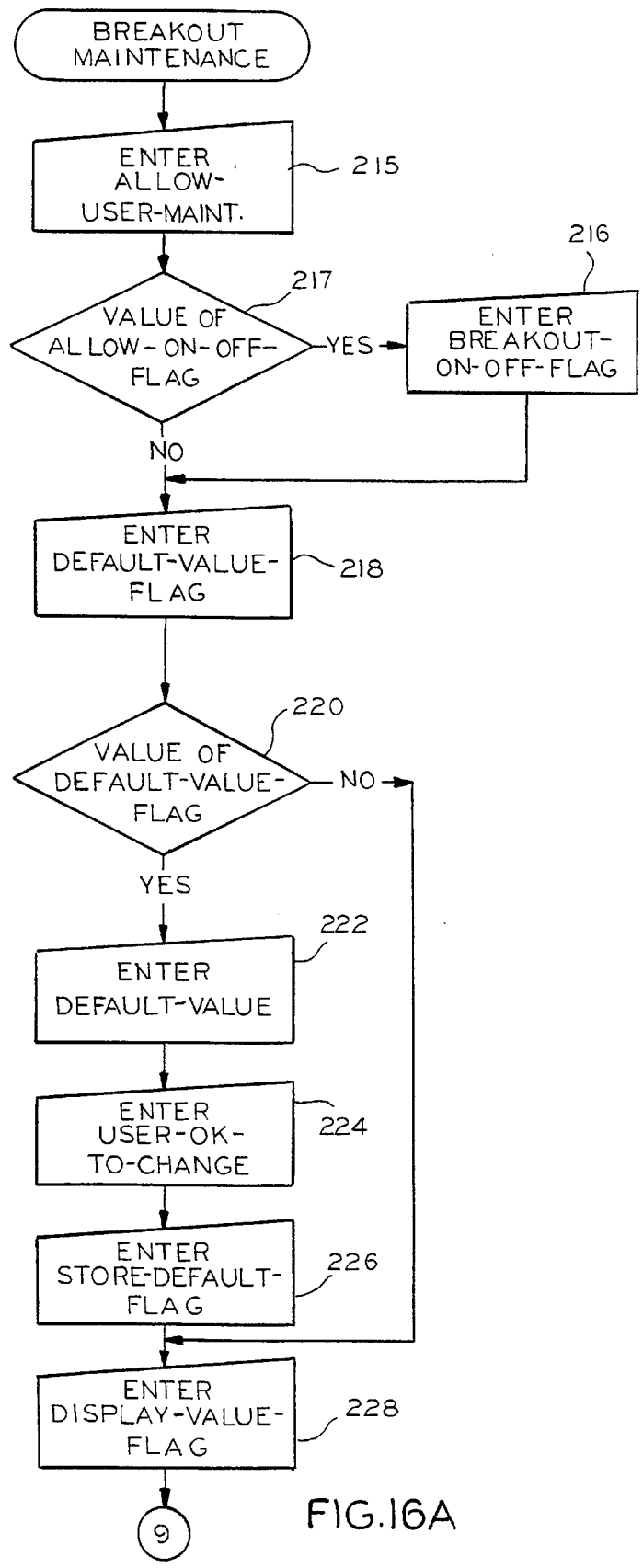
Figure 16B:
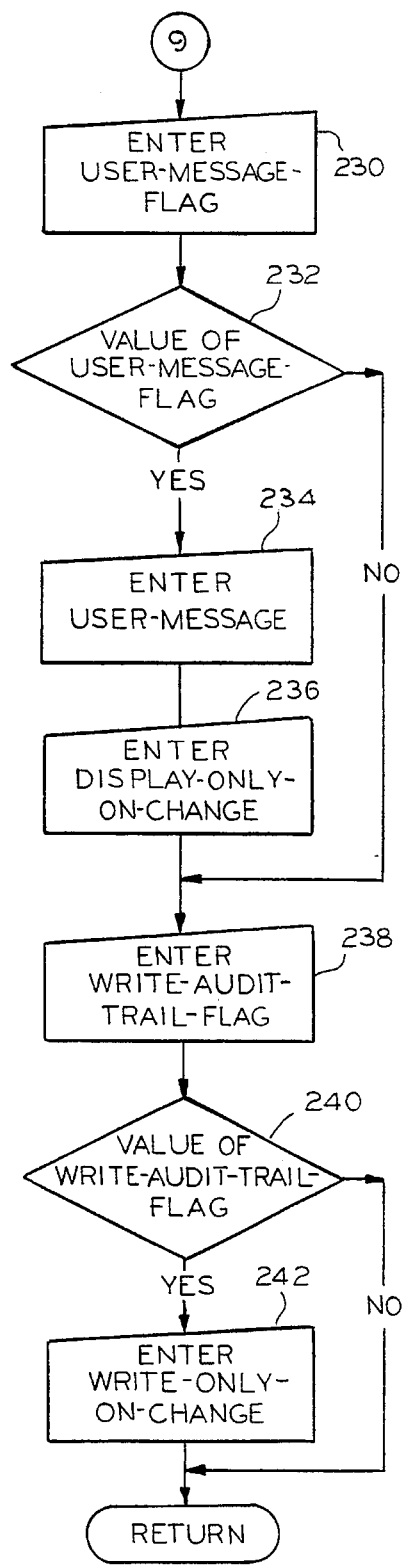

Referring to FIGS. 16A and 16B, a block diagram illustrates the breakout maintenance routine performed at the block 198 of FIG. 14. This is a maintenance routine for the breakout record file. This routine begins at a block 215 by prompting the user determine if the user will have permission to change breakout information. A decision block 217 determines the value of the allow on-off flag. If yes, then the user is prompted to set the breakout on/off flag at a block 216. The user is then prompted to enter the default value flag at block 218. A decision block 220 determines, the value of the default value flag. If the default value flag value is set to yes, then the user is prompted to enter the default value at a block 222, to set the user OK to change flag at a block 224 and to set the store default flag at a block 226. Thereafter, or if the value of the default flag is no, as determined at decision block 220, then the user is prompted to set the display value flag at a block 228 and the user message flag at a block 230. A decision block 232 determines the value of the user message flag. If yes, then the user is prompted to enter a user message at a block 234 and is prompted to set the display only on change flag at a block 236. Thereafter, or if the value of the user message flag was no, as determined at the decision block 232, then the user is prompted to set the write audit trail flag at a block 238. A decision block 240 determines the value of the write audit trail flag. If yes, then the user is prompted to set the write only on change flag at a block 242. Thereafter, or if the value of the write audit trail flag is no, as determined at the decision block 240, then the routine ends as by returning to the flow diagram of FIG. 14.

Figure 17:
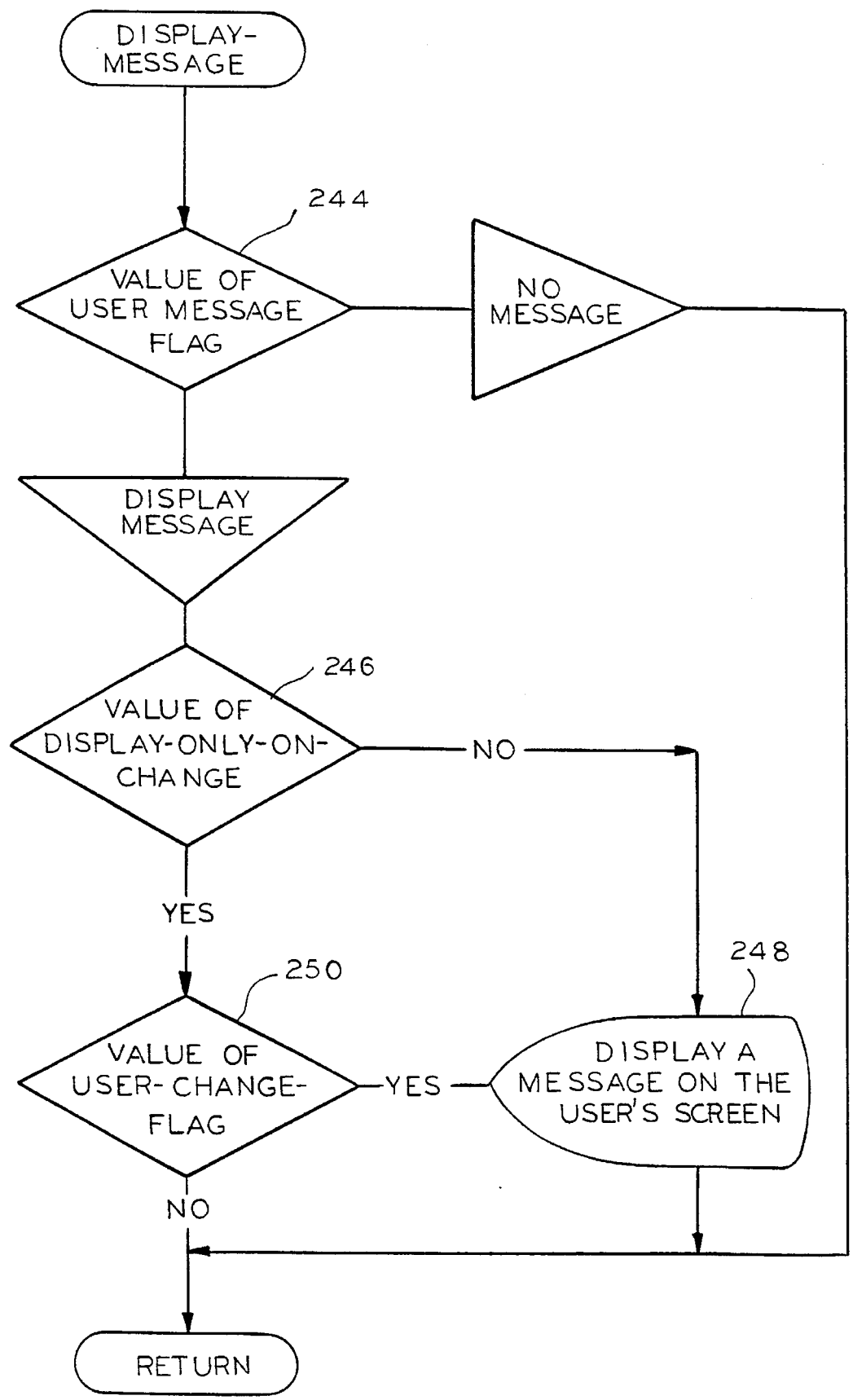

Referring to FIG. 17, the DISPLAY MESSAGE routine performed at block 206 of FIG. 14 is illustrated. This procedure displays a message on the user display monitor 34. This routine begins at a decision block 244, which determines the value of the user message flag. If no message, then the routine ends. If the value is "display message", then the decision block 246 determines the value of the display only on change flag. If not, then the message displayed on the user's screen at a block 248. If yes, then a decision block 250 determines the value of the user change flag. If yes, then the message is displayed on the user's screen at the block 248. If not, or after the message is displayed, then the routine ends as by returning to the flow diagram of FIG. 14.

Figure 15:
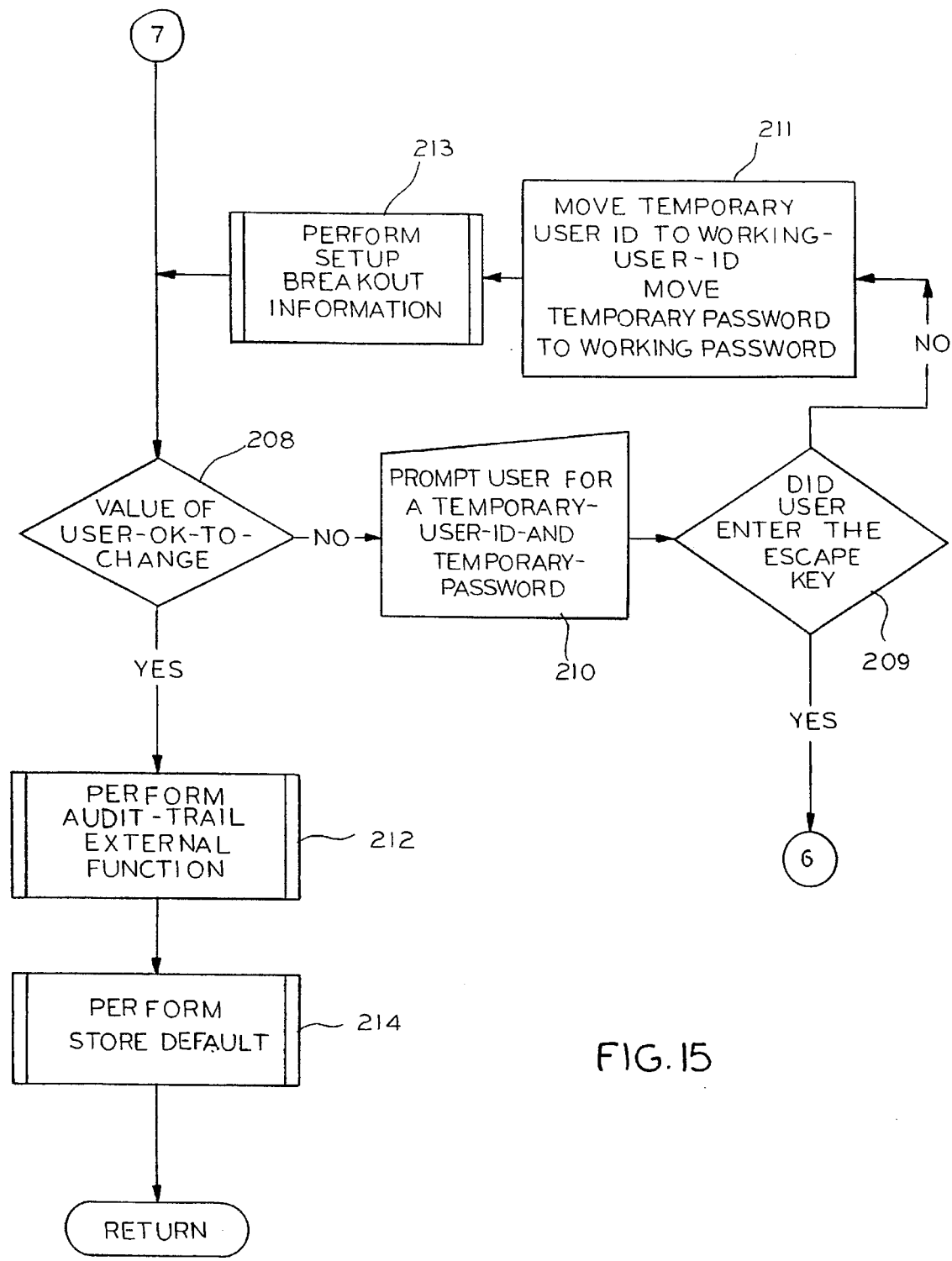
Figures 18, 19:
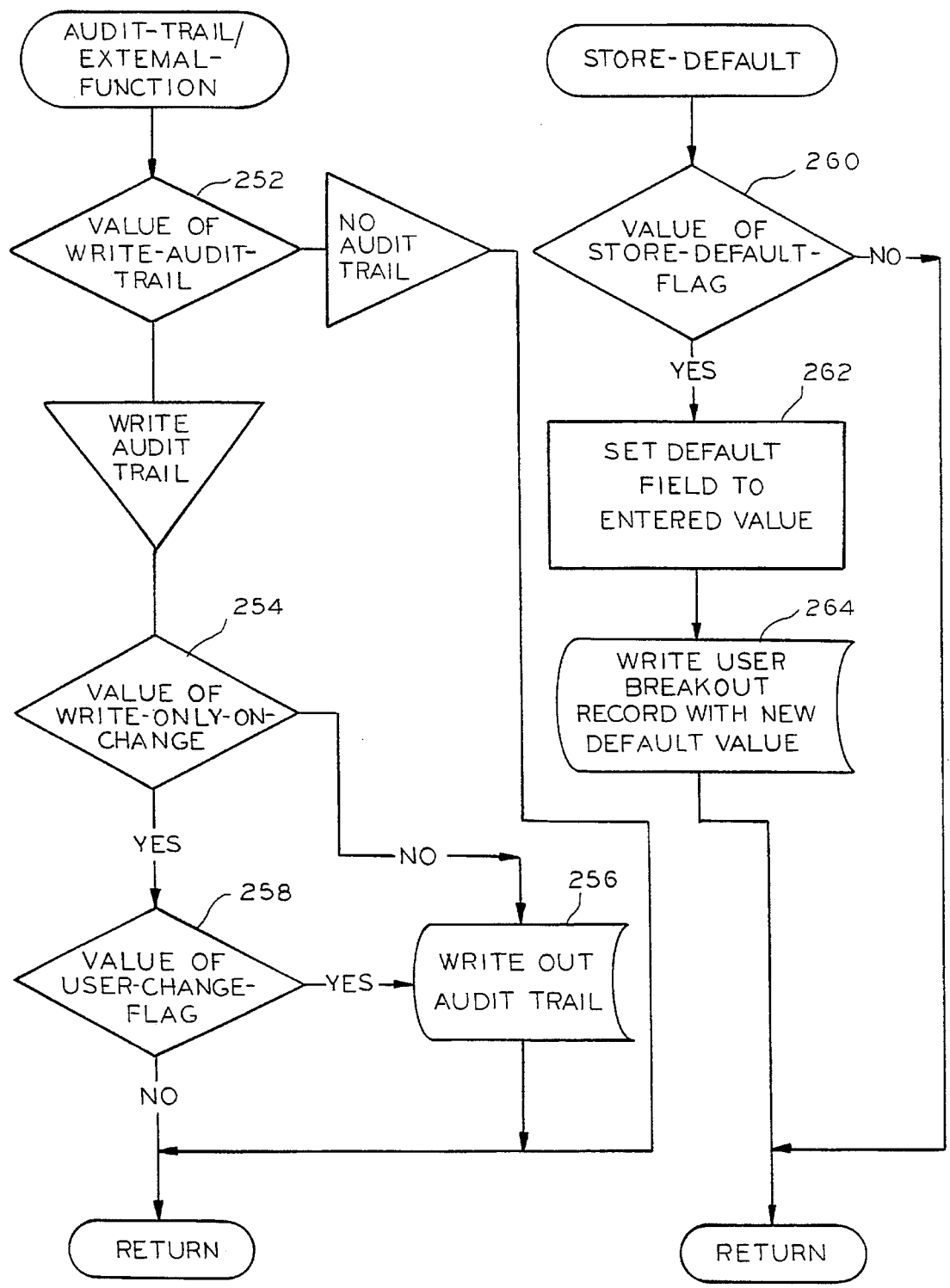

Referring to FIG. 18, a flow diagram illustrates the audit trail/external function routine performed at the block 212 of FIG. 15. This routine is a log routine which allows specific data to be tracked by user and type of access or to invoke external functions. This routine begins at a decision block 252 which determines the value of the write audit trail flag. If no, then the routine ends. If the write audit trail flag is yes, then a decision block 254 determines the value of the write only on change flag. If no, then a write out is performed to the audit trail at the block 256 and the routine ends. If the value of the write only on change flag is yes, then a decision block 258 determines the value of the user change flag. If yes, the control proceeds to the decision block 256. If no, then the routine ends as by returning to the flow diagram of FIG. 15.

Referring to FIG. 19, a flow diagram illustrates the STORE DEFAULT routine performed at the block 214 of FIG. 15. This routine stores the entered value as the new default value. The routine begins at a block 260, which determines the value of the store default flag. If no, then the routine ends. If yes, then the default field is set to the entered value at a block 262. The breakout record file is then written with the new default value at a block 264 and the routine ends by returning to the flow diagram of FIG. 15.

The usefulness of the invention is explained with the following example. A set of illustrations of display screens in FIGS. 20A–20E for display on the monitor 34 of FIG. 1 show an example of one specific application of the intelligent interface. In this example, a user is entering an order into an order entry database type application program. The particular program illustrated includes provision for a customer file which maintains the standard customer order preferences for billing and shipping addresses as well as shipping method and time frame. It also defines the customer's credit terms and normal taxation. This pre-defined customer data can be used on an individual order transaction easily by use of specified function keys when entering the field. At the end of the screen there is another opportunity to change fields on the screen when asked if there is a field number to change.

Figure 20A:
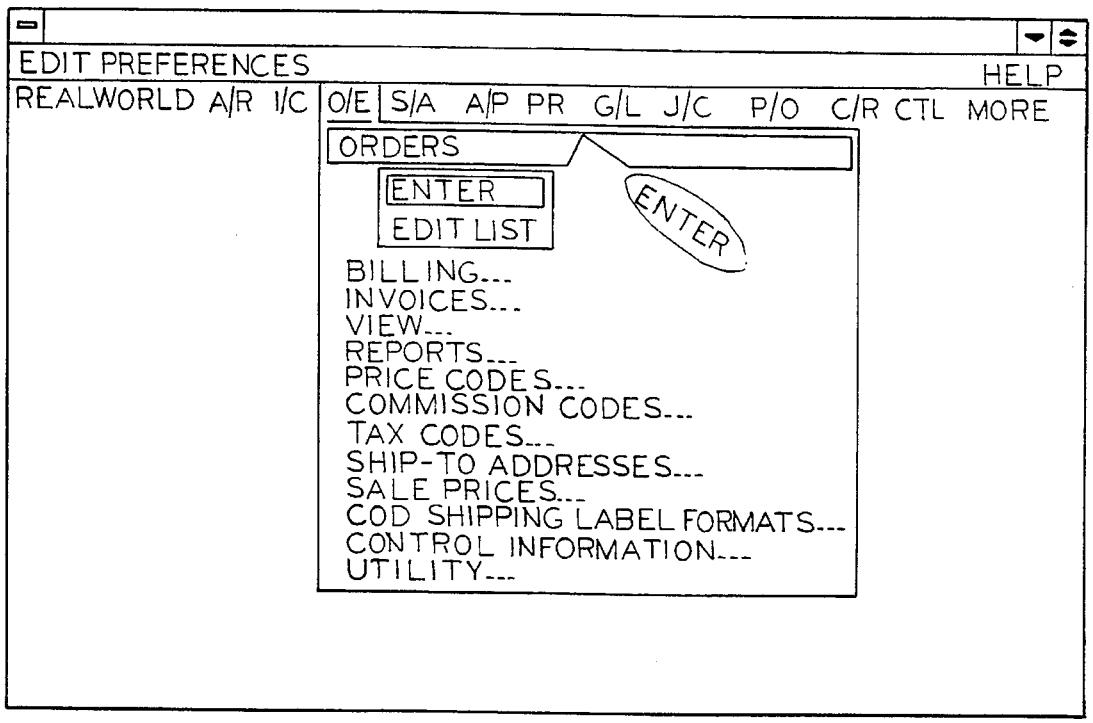
Figure 20B:
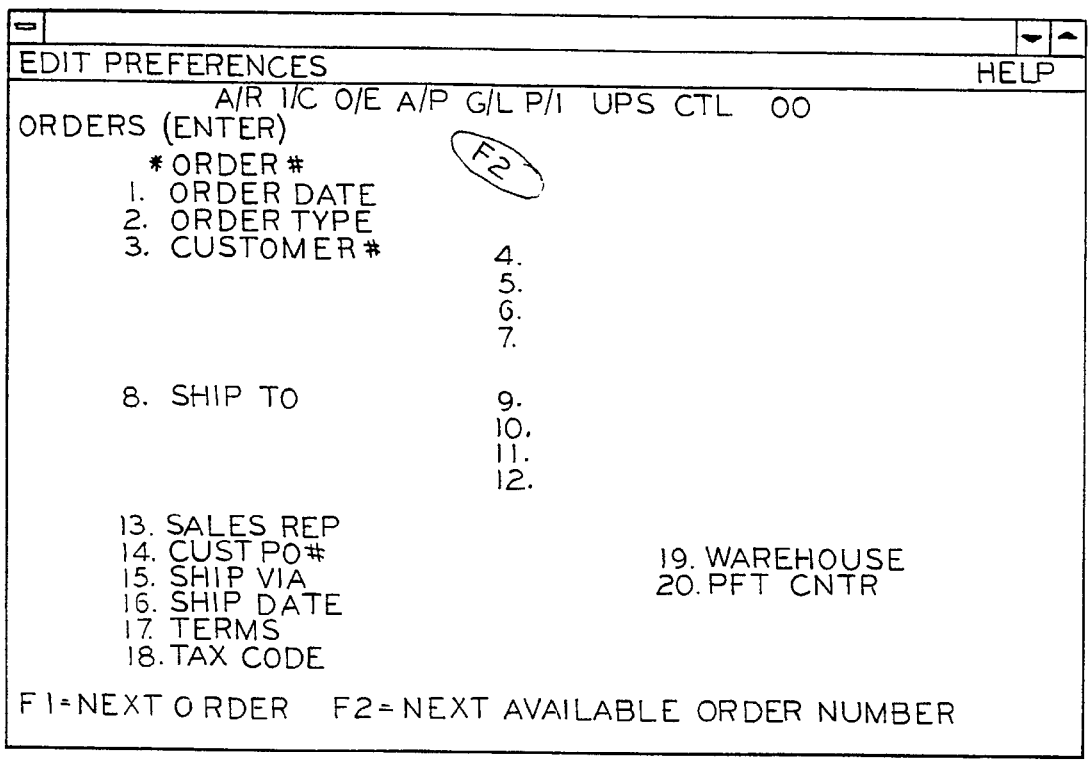

FIG. 20A shows a menu screen used for selecting the type of database table to be used. In this example, the user selects an operation to enter orders by highlighting the appropriate fields as shown and depressing the return or enter key. (The key to be depressed by the user is shown circled in the illustration.) As a result, the table in FIG. 20B is displayed on the monitor 34. This consists of a table including twenty user fields in which information is to be entered. Without the intelligent interface, the user must enter data in each field, or leave the field blank, with entered data being accepted by hitting the enter or return key. Because there are twenty fields, this requires more than twenty key strokes to complete all fields in the table.

In accordance with the invention, the intelligent interface includes a record file for each user authorized to log on to the system. The record file is used to enter default information into the fields in the table according to the specific user requirements as programmed. Additionally, security functions are provided by limiting certain fields which the user might not have access to. For example, different levels of security might be specified. Certain users might be allowed simply to view information but not to add or change data in any fields. Other users might be permitted to enter new orders, but not change existing orders. Also, the system is provided with pop-up windows for fields such as customer number to include a listing of all available customers for selection. The pop-up windows can be customized per user so that only customers common to that user show up in the pop-up window.

Referring to FIG. 20B, the first field to be filled out is the order number, as indicated by the underline after the field. The user can either type an order number or, using function key F2, accept the next available order number, which is done in the example. The intelligent interface then automatically enters the current date in the order date field and order in the order type field, eliminating requirement for the specific user to enter data into those fields. The next field to be filled out is field number 3 for the customer number, which is shown as a pop-window display as shown in FIG. 20C. The user can then highlight any one of the listed customers or enter a different customer number and then press the enter key to accept the highlighted or selected customer. Doing so results in fields 3–12, relating to the particular customer, being filled out with default values, as is field 13, related to the sales representative, as shown in FIG. 20D. The next field to be filled out is number 14 for the customer P.O. number, which must be entered manually followed by the enter key. In the example, the system is programmed so that the specific user is not required to enter any information in the remaining fields 15–20. This display is shown in FIG. 20E. Prior to completing the order, the user is asked if there are any field numbers to change. If so, then the user can select the field number and change appropriate information. However, security is provided by use of the autoreturn key discussed above. For each specific user, fields might be defined in which the autoreturn key is used in the change mode. For example, if the specific user is not permitted to change sales terms in field 17, then the autoreturn key on change mode, and possibly on add mode, will be used with respect to that field. If the user enters field number 17 to change, the current field value will be shown and the system will automatically simulate the user pressing the return key. The effect is that the user cannot change the particular value. This autoreturn function is also used in the add mode with respect to fields 15–20 in which the user was not required to enter any data or accept data by hitting the return key.

While the system is shown with one specific example relative to one specific type user, as can be appreciated the record file 60 is customized for each user or type of user.

As discussed above, the user specific intelligent interface is interposed between the application and the user to control data access and .dynamically improve user productivity. The system includes permissions regarding use of specific data items or selection choices and processes instructions regarding usage by specific users of individual data fields displayed on the screen.

The interface intercepts and filters data being sent between each specific user and the application running. The interface performs a defined set of functions on the data before passing the data on or passing other data on to the user or application. It also records the usage of each application for the purpose of facilitating future similar usage and learns the way in which each specific user interacts with the application. The system also simplifies problems in software development by reducing design considerations involving specific user security and productivity factors. An application program can be written to include a basic user interface allowing all users unlimited access. The intelligent interface works with the application program to customize the user interface to specific users and their needs.

We claim:

1. In a data processing system including a central processing unit (CPU), memory, means for receiving input commands from an input device and means for transmitting output commands to an output device, the CPU running an application program stored in the memory, the application program implementing a structured dialog, represented by a table having plural fields, in which the application transmits to the output device output commands associated with fields in the table and also transmits to the output device requests for input commands to be entered on the input device for insertion in the fields, a user specific intelligent interface comprising:

file means for storing in the memory a plurality of record files, each identifying a specific user with a user ID, each record file storing input and output commands operatively associated with each user ID for generating user specific record file stored input or output commands for select fields in the application program table;

input intercept means for intercepting each request for an input command transmitted by the application;

output intercept means for intercepting each output command transmitted by the application;

processing means, operatively associated with said file means, said input intercept means and said output intercept means, for determining if a request for an input command to be entered by a user or an output command transmitted by the application is for one of the select fields, and if so then implementing the stored input and/or output commands for the select field, and otherwise passing the received input command to the application or the transmitted output command to the output device.

2. The user specific intelligent interface of claim 1 wherein an input command is passed to the application program after a terminate command is entered on the input device and wherein said file means transmits any stored input command from the record file select field and the user accepts the stored input command by entering a terminate command.

3. The user specific intelligent interface of claim 2 wherein said file means selectively includes a stored terminate command for select ones of the fields so that a user cannot change a stored input command.

4. The user specific intelligent interface of claim 1 wherein said processing means includes log means for selectively recording usage of each user ID record file stored input and output commands for the select fields.

5. The user specific intelligent interface of claim 1 wherein said file means stores a user password associated with each said user ID.

6. In a dam processing system including a central processing unit (CPU), memory, means for receiving input commands from an input device and means for transmitting output commands to an output device, the CPU running an application program stored in the memory, the application program implementing a structured dialog, represented by a table having plural fields, in which the application transmits to the output device output commands associated with fields in the table and also transmits to the output device requests for input commands to be entered on the input device for insertion in the fields, a user specific intelligent interface comprising:

file means for storing in the memory a plurality of record files, each identifying a specific user with a user ID, each record file storing output commands operatively associated with each user ID for generating user specific record file stored output commands for select fields in the application program table;

output intercept means for intercepting each output command transmitted by the application;

processing means, operatively associated with said file means and said output intercept means, for determining if an output command transmitted by the application is for one of the select fields, and if so then implementing the stored output command for the select field, and otherwise passing the transmitted output command to the output device.

7. The user specific intelligent interface of claim 6 wherein said processing means includes log means for selectively recording usage of each user ID record file stored output command for the select fields.

8. The user specific intelligent interface of claim 6 wherein said file means stores a user password associated with each said user ID.

9. In a data processing system including a central processing unit (CPU), memory, means for receiving input commands from an input device and means for transmitting output commands to an output device, the CPU running an application program stored in the memory, the application program implementing a structured dialog, represented by a table having plural fields, in which the application transmits to the output device output commands associated with fields in the table and also transmits to the output device requests for input commands to be entered on the input device for insertion in the fields, a user specific intelligent interface comprising:

file means for storing in the memory a plurality of record files, each identifying a specific user with a user ID, each record file storing input commands operatively associated with each user ID for generating user specific record file stored input commands for select fields in the application program table;

input intercept means for intercepting each request for an input command transmitted by the application;

processing means, operatively associated with said file means and said input intercept means, for determining if a request for an :input command to be entered by a user is for one of the select fields, and if so then implementing the stored input command for the select field, and otherwise passing the received input command to the application.

10. The user specific intelligent interface of claim 9 wherein an input command is passed to the application program after a terminate command is entered on the input device and wherein said file means transmits any stored input command from the record file select field and the user accepts the stored input command by entering a terminate command.

11. The user specific intelligent interface of claim 10 wherein said file means selectively includes a stored terminate command for select ones of the fields so that a user cannot change a stored input command.

12. The user specific intelligent interface of claim 9 wherein said processing means includes log means for selectively recording usage of each user ID record file stored input and output commands for the select fields.

13. The user specific intelligent interface of claim 9 wherein said file means stores a user password associated with each said user ID.

14. In a data processing system including a central processing unit (CPU), memory, means for receiving input commands from an input device and means for transmitting output commands to an output device, the CPU running an application program stored in the memory, the application program implementing a structured dialog, represented by a table having plural fields, in which the application transmits to the output device output commands associated with fields in the table and also transmits to the output device requests for input commands to be entered on the input device for insertion in the fields, a user specific intelligent interface comprising:

file means for storing in the memory a plurality of record files, each identifying a specific user with a user ID, each record file storing input commands operatively associated with each user ID for generating user specific record file stored input commands for select fields in the application program table;

input intercept means for intercepting each input command entered on the input device;

processing means, operatively associated with said file means and said input intercept means, for determining if an input command to be entered by a user is for one of the select fields, and if so then implementing the stored input command for the select field.

15. The user specific intelligent interface of claim 14 wherein an input command is passed to the application program after a terminate command is entered on the input device and wherein said file means transmits any stored input command from the record file select field and the user accepts the stored input command by entering a terminate command.

16. The user specific intelligent interface, of claim 15 wherein said file means selectively includes a stored terminate command for select ones of the fields so that a user cannot change a stored input command.

17. The user specific intelligent interface of claim 14 wherein said processing means includes log means for selectively recording usage of each user ID record file stored input and output commands for the select fields.

18. The user specific intelligent interface of claim 14 wherein said file means stores a user password associated with each said user ID.

* * * * *